(12) United States Patent
Shintani

(10) Patent No.: US 9,739,323 B2
(45) Date of Patent: Aug. 22, 2017

(54) DISC BRAKE VIBRATION ESTIMATION METHOD AND DISC BRAKE VIBRATION ESTIMATION DEVICE

(71) Applicant: Kouhei Shintani, Nissin (JP)

(72) Inventor: Kouhei Shintani, Nissin (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 98 days.

(21) Appl. No.: 14/422,529

(22) PCT Filed: Nov. 19, 2013

(86) PCT No.: PCT/IB2013/002580
§ 371 (c)(1),
(2) Date: Feb. 19, 2015

(87) PCT Pub. No.: WO2014/080261
PCT Pub. Date: May 30, 2014

(65) Prior Publication Data
US 2015/0233433 A1    Aug. 20, 2015

(30) Foreign Application Priority Data

Nov. 20, 2012 (JP) ................. 2012-254542

(51) Int. Cl.
*F16D 65/00* (2006.01)
*G01M 13/02* (2006.01)
(Continued)

(52) U.S. Cl.
CPC ....... *F16D 65/0006* (2013.01); *F16D 55/225* (2013.01); *G01L 5/28* (2013.01); *G01M 13/028* (2013.01)

(58) Field of Classification Search
CPC ..... F16D 65/0006; F16D 55/225; G01L 5/28; G01M 13/028; G01M 13/022;
(Continued)

(56) References Cited

U.S. PATENT DOCUMENTS 3,208,266 A * 9/1965 Black ................ G01N 3/56
73/121
6,216,827 B1    4/2001 Ichiba et al.
(Continued)

FOREIGN PATENT DOCUMENTS

DE    10 2005 022 097 A1    11/2006
EP    1 157 908 A1    11/2001
(Continued)

OTHER PUBLICATIONS

International Search Report for corresponding International Patent Applicaiton No. PCT/IB2013/002580 mailed May 30, 2014.
(Continued)

*Primary Examiner* — Laura Martin
*Assistant Examiner* — Rose M Miller
(74) *Attorney, Agent, or Firm* — Sughrue Mion, PLLC

(57) ABSTRACT

A disc brake vibration estimation method includes a step of obtaining input physical amounts that are physical amounts about the disc rotor and the pad, a step of estimating a vibration of the disc brake in an in-plane direction which is a circumferential direction of the disc rotor according to the obtained input physical amounts and a fluctuation in contact stiffness between the disc rotor and the pad, and a step of making a determination at least about squeal of the disc brake in the in-plane direction according to a displacement or a value derived from the displacement after a prescribed period from a start of estimation after the vibration of the disc brake is estimated.

4 Claims, 3 Drawing Sheets

(51) Int. Cl.
*F16D 55/225* (2006.01)
*G01L 5/28* (2006.01)

(58) Field of Classification Search
CPC ........ G01H 17/00; G01H 1/003; G01N 19/02;
G01N 19/08; G01N 29/14
USPC ...... 73/649, 660, 579, 572, 593; 702/34, 39,
702/56, 103, 183, 184, 185
See application file for complete search history.

(56) References Cited

U.S. PATENT DOCUMENTS

| | | | |
|---|---|---|---|
| 2001/0049577 A1 | 12/2001 | Kesselgruber | |
| 2004/0093195 A1* | 5/2004 | Goto | G06F 17/5018 703/2 |
| 2004/0243310 A1* | 12/2004 | Griffin | G01H 1/006 702/10 |
| 2006/0219500 A1* | 10/2006 | Lu | F16D 65/12 188/218 XL |
| 2009/0127975 A1 | 5/2009 | Hanselka et al. | |

FOREIGN PATENT DOCUMENTS

| | | |
|---|---|---|
| JP | 10-089388 A | 4/1998 |
| JP | 2004-019715 A | 1/2004 |
| WO | 2013/084363 A1 | 6/2013 |

OTHER PUBLICATIONS

Kazuhide Ohta, Koji Kagawa, Toshio Eto, and Susumu Nishikawa: "Study on Disc Brake Squeal", Transactions of the Japan Society of Mechanical Engineers (Series C), The Japan Society of Mechanical Engineers (General Incorporated Association), Feb. 21, 2008, vol. 50, No. 457, pp. 1585-1593.

Partial Translation of Japanese Office Action issued on Dec. 12, 2014 for corresponding JP Patent Application No. 2012-254542.

* cited by examiner

REPRODUCTION OF
IN-PLANE FIRST MODE

ESTIMATION OF
IN-PLANE FIRST MODE

DISC BRAKE VIBRATION ESTIMATION METHOD AND DISC BRAKE VIBRATION ESTIMATION DEVICE

BACKGROUND OF THE INVENTION

1. Field of the Invention

The present invention relates to a disc brake vibration estimation method and a disc brake vibration estimation device.

2. Description of Related Art

A disc brake generates braking torque by bringing a pad into contact with a rotating disc rotor with hydraulic pressure of a hydraulic pressure cylinder. In the disc brake, a vibration is caused by contact of the pad with the rotating disc rotor and results in resonance between the rotating disc rotor and the pad to cause "brake squeal". Here, vibration modes of brake squeal are categorized into an in-plane vibration mode and an out-of-plane vibration. In the out-of-plane vibration mode, a friction surface of the disc rotor which the pad contacts vibrates in the same direction as the rotational direction. In the in-plane vibration mode, the friction surface of the disc rotor vibrates in the circumferential direction of the disc rotor.

A technology that estimates the brake squeal corresponding only to the out-of-plane vibration has been suggested mode. Further, a method has been suggested that estimates the characteristic frequency of the disc rotor focusing on the in-plane vibration mode (Japanese Patent Application Publication No. 2004-19715 (JP 2004-19715 A)).

As described above, because the in-plane vibration mode is a factor constituting the brake squeal, it is demanded to estimate the vibration of the disc brake in the in-plane vibration mode. Further, if vibrations of the disc brake in both of the out-of-plane vibration mode and the in-plane vibration mode can be estimated, a model of the disc brake is created, and the brake squeal can be estimated through simulation, thus enabling design of the disc brake that reduces the brake squeal.

SUMMARY OF THE INVENTION

The present invention has been made in consideration of an above circumstance, and an object thereof is to provide a disc brake vibration estimation method and a disc brake vibration estimation device that can estimate a vibration of a disc brake in an in-plane direction.

A disc brake vibration estimation method in accordance with a first aspect of the present invention estimates a vibration during contact between a disc rotor and a pad of a disc brake that generates braking force by bringing the disc rotor which is rotating into contact with the pad. In particular, the disc brake vibration estimation method includes: a step of obtaining input physical amounts that are physical amounts at least about the disc rotor and the pad; and a step of estimating a vibration of the disc brake in an in-plane direction which is a circumferential direction of the disc rotor according to at least the obtained input physical amounts and a fluctuation in contact stiffness between the disc rotor and the pad.

The disc brake vibration estimation method may further include a step of making a determination at least about squeal of the disc brake in the in-plane direction according to a displacement or a value derived from the displacement after a prescribed period from a start of estimation after the vibration of the disc brake is estimated.

Further, in the disc brake vibration estimation method, a process of estimating the vibration of the disc brake may be conducted according to equation 1 indicated below.

$$[M]\{\ddot{x}\}+([K]+[U]\cdot\cos\omega t)\{x\}=0 \qquad [\text{Equation 1}]$$

In the equation, $[M]$ is a mass matrix of the disc brake, $[K]$ is a stiffness matrix of the disc brake, $[U]$ is a contact stiffness matrix between the disc rotor and the pad, $\omega$ is a pad characteristic frequency which corresponds to a vibration mode of the pad during the vibration of the disc brake in the in-plane direction, and x is a displacement of the disc brake.

Further, in the disc brake vibration estimation method, the contact stiffness matrix is based on a distribution of contact pressure of the pad and a mode vector of the pad.

A disc brake vibration estimation device in accordance with a second aspect of the present invention estimates a vibration during contact between a disc rotor and a pad of a disc brake that generates braking force by bringing the disc rotor which is rotating into contact with the pad. The disc brake vibration estimation method includes: an input physical amount obtainment section which obtains input physical amounts that are physical amounts at least about the disc rotor and the pad; a vibration estimation section which estimates a vibration of the disc brake in an in-plane direction which is a circumferential direction of the disc rotor according to at least the obtained input physical amounts and a fluctuation in contact stiffness between the disc rotor and the pad; and a display section which displays the estimated vibration of the disc brake.

The disc brake vibration estimation method in accordance with the first aspect and the disc brake vibration estimation device in accordance with the second aspect of the present invention can estimate at least a vibration of the disc brake in the in-plane direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
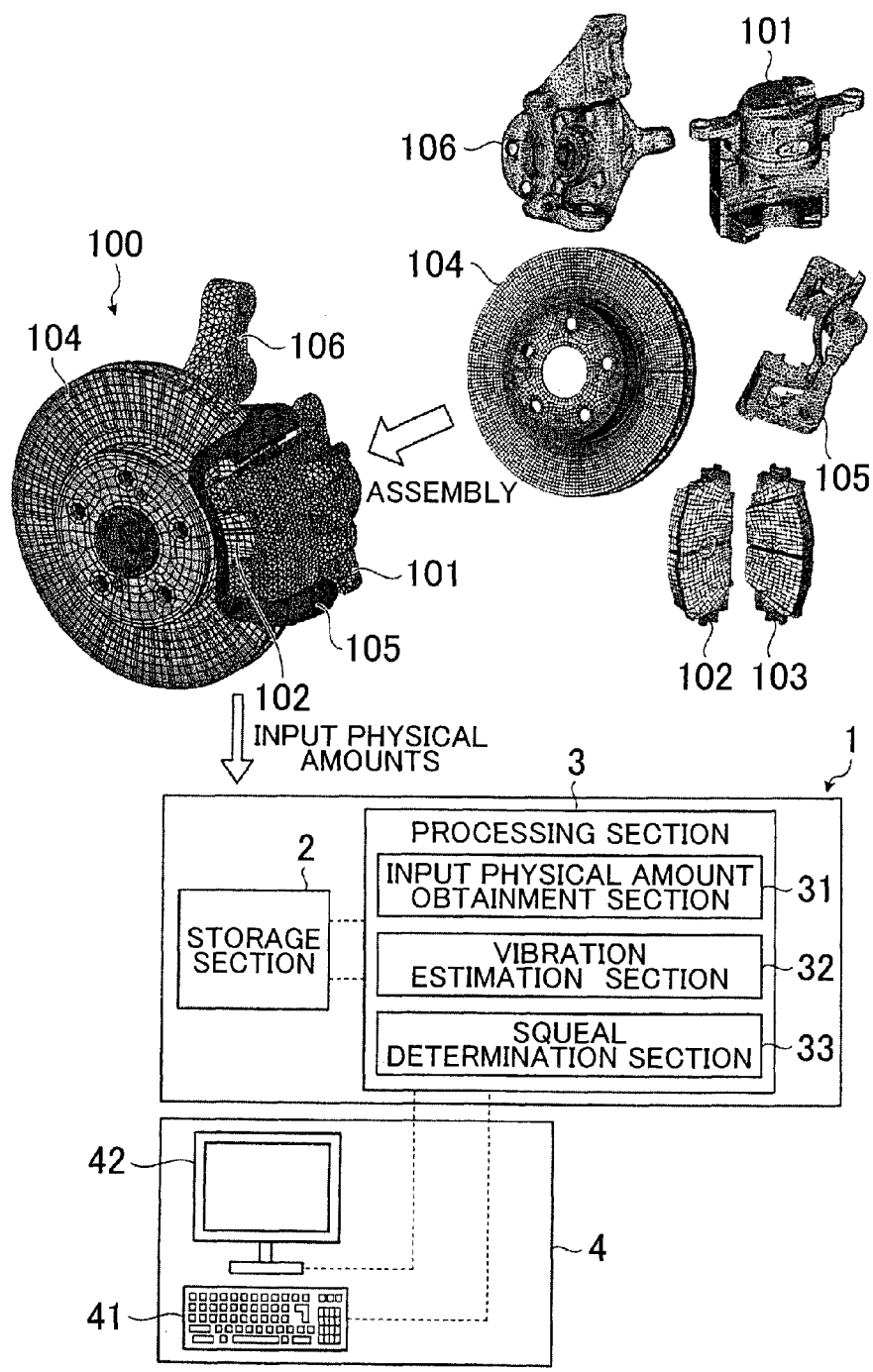
FIG. 1 illustrates an exemplary configuration of a disc brake vibration estimation device that carries out a disc brake vibration estimation method in accordance with an embodiment.

Modes for carrying out the present invention (embodiments) will be described in detail with reference to drawing. The present invention is not limited by contents described in the following embodiments. Further, structural elements described below include those that can easily be conceived by persons skilled in the art and those that are substantially the same. Further, configurations described below can appropriately be combined. Still further, the configurations can be omitted, substituted, or modified in various manners without departing from the gist of the present invention.

A disc brake vibration estimation method and a disc brake vibration estimation device in accordance with a first embodiment of the present invention performs (i) an estimation of at least a vibration of a disc brake in an in-plane vibration mode and (ii) a squeal determination of whether or not the vibration of the disc brake is at a level of brake squeal. FIG. 1 illustrates an exemplary configuration of the disc brake vibration estimation device that carries out the disc brake vibration estimation method in accordance with the embodiment.

A disc brake vibration estimation device 1, with a disc brake 100 as an estimated object, performs (i) estimation of a vibration during contact between a disc rotor 104 and pads 102, 103, that is, a vibration of the disc brake 100 in an in-plane vibration mode in this embodiment and (ii) a squeal determination of whether or not the vibration of the disc brake 100 is at a level of brake squeal when braking force is generated by bringing the pads 102, 103 into contact with the disc rotor 104 that is rotating. The disc brake vibration estimation device 1 is configured to include a processing section 3 as processing means and a storage section 2. An input-output device 4 is connected to the disc brake vibration estimation device 1. Input means 41 contained in the input-output device 4 inputs input physical amounts and provides commands such as a command for making the processing section 3 carry out the disc brake vibration estimation method to the storage section 2 and the processing section 3. Here, input devices such as a keyboard, a mouse, and a microphone can be used as the input means 41. Means by which the disc brake vibration estimation device 1 obtains the input physical amounts is not only the input means 41, but the disc brake vibration estimation device 1 may also obtain the input physical amounts that are previously stored in the storage section 2 or stored in outside storage means via wired or wireless communication via an input output interface and a communication interface (neither shown).

Here, in the disc brake 100, the pads 102, 103 mounted on a caliper 101 are arranged to face each other in a rotational axis direction of the disc rotor 104 across the disc rotor 104. A hydraulic cylinder (not shown) is provided in the caliper 101. The distance between the pads 102, 103 is reduced by pressing force generated by the hydraulic cylinder, and the pads 102, 103 thereby contact the disc rotor 104 that integrally rotates with a wheel (not shown) to generate frictional force. The generated frictional force acts on the caliper 101 in an opposite direction to a rotational direction of the disc rotor 104 and thereby serves as braking force that decelerates a vehicle (not shown). In other words, the disc brake 100 generates braking force. A reference numeral 105 denotes a mounting bracket which moveably supports the caliper 101 and the pads 102, 103 with respect to the disc rotor 104 in the rotational axis direction. Further, a reference numeral 106 denotes a hub to which the disc rotor 104 is fixed.

A disc brake vibration estimation program in which the disc brake vibration estimation method in accordance with this embodiment that implements the estimation of a vibration of the disc brake 100 is incorporated is stored in the storage section 2. Here, the storage section 2 can be configured with fixed disk device such as a hard disk device, a non-volatile memory such as a flexible disk, a magneto-optical disk device, or flash memory (a storage medium such as a CD-ROM which only enables read-out), storage means such as a volatile memory such as a random access memory (RAM), or a combination thereof.

Here, the disc brake vibration estimation program is not necessarily limited to a program configured as a single system, but can be a program that achieves its function by cooperating with an individual program that has already been stored in a computer system and is represented by operating system (OS), for example. Further, the disc brake vibration estimation program for implementing a function of the processing section 3 shown in FIG. 3 may be stored in a storage medium from which the program can be read out by a computer, and a computer system may be made read out the disc brake vibration estimation program recorded in the storage medium and execute the program, thereby carrying out the disc brake vibration estimation method in accordance with this embodiment. It should be noted that a "computer system" herein includes an OS and hardware such as peripheral devices.

The processing section 3 is configured with memories such as a RAM and a ROM and a central processing unit (CPU). When the vibration of the disc brake 100 is estimated, the processing section 3 reads the disc brake vibration estimation program in a memory (not shown) of the processing section 3 and performs calculation on the basis of the input physical amounts input to the disc brake vibration estimation device 1 as described above. The processing section 3 appropriately stores a value in an intermediate step of calculation in the storage section 2 and appropriately retrieves the stored value from the storage section 2 to perform calculation. Further, the processing section 3 may be implemented by dedicated hardware instead of the disc brake vibration estimation program. An estimation result of a vibration of the disc brake 100, a determination result of brake squeal, and the like that are created by calculation of the processing section are displayed by display means 42 of the input-output device 4. Here, a liquid crystal display (LCD), a cathode ray tube (CRT), and the like can be used as the display means 42. Further, the estimation results of a vibration of the disc brake 100, the determination result of the brake squeal, and the like can be output to a printer (not shown). Moreover, the storage section 2, may be provided in the processing section 3 or may be provided in another device (a database server, for example). In addition, the disc brake vibration estimation device 1 may be configured to be accessible from a terminal device (not shown) that includes the input-output device 4 by either means of wired and wireless communication.

The processing section 3 is configured to include the input physical amount obtainment section 31, a vibration estimation section 32, and a squeal determination section 33.

The input physical amount obtainment section 31 obtains the input physical amounts input by the input means 41 or the input physical amounts that have already been stored in the storage section 2. There, the input physical amounts are information about the caliper 101, the pad 102, the pad 103, the disc rotor 104, the mounting bracket 105, and the hub 106 including, for example, dimensions, masses, materials, moments of inertia, longitudinal elastic moduli, shear moduli, and the like of those parts.

The vibration estimation section 32 obtains the input physical amounts and estimates a vibration of disc brake 100 on the basis of the obtained input physical amounts and the fluctuation in contact stiffness between the disc rotor 104 and the pads 102, 103. In this embodiment, the vibration estimation section 32 estimates a vibration of the disc brake 100 on the basis of the input physical amounts and equation 1 indicated below.

$$[M]\{\ddot{x}\}+([K]+[U]\cdot\cos \omega t)\{x\}=0 \quad \text{[Equation 1]}$$

Here, [M] is a mass matrix of the disc brake 100, [K] is a stiffness matrix of the disc brake 100, [U] is a contact stiffness matrix between the disc rotor 104 and the pads 102, 103, x is a displacement of the disc brake 100, cos ωt is a periodic function, and ω is in-plane vibration modes of the pads 102, 103 during a vibration of the disc brake 100 in an in-plane direction, for example, a characteristic frequency of the pad corresponding to an in-plane first mode.

In this embodiment, after the vibration estimation section 32 estimates the vibration of the disc brake 100, the squeal determination section 33 makes a determination about squeal of the disc brake 100 in the in-plane direction on the basis of a displacement of the disc rotor 104 after a prescribed period from a start of estimation. Specifically, the squeal determination section 33 determines whether or not a displacement x of a prescribed node in an FFT model of the disc rotor 104 as an object of determination after the elapse of a prescribed period $t_0$ from the start of estimation is a reference value $u_{max}$ or larger and determines that brake squeal of the disc brake 100 in the in-plane direction occurs if the displacement x is the reference value $u_{max}$ or larger.

Figure 2:
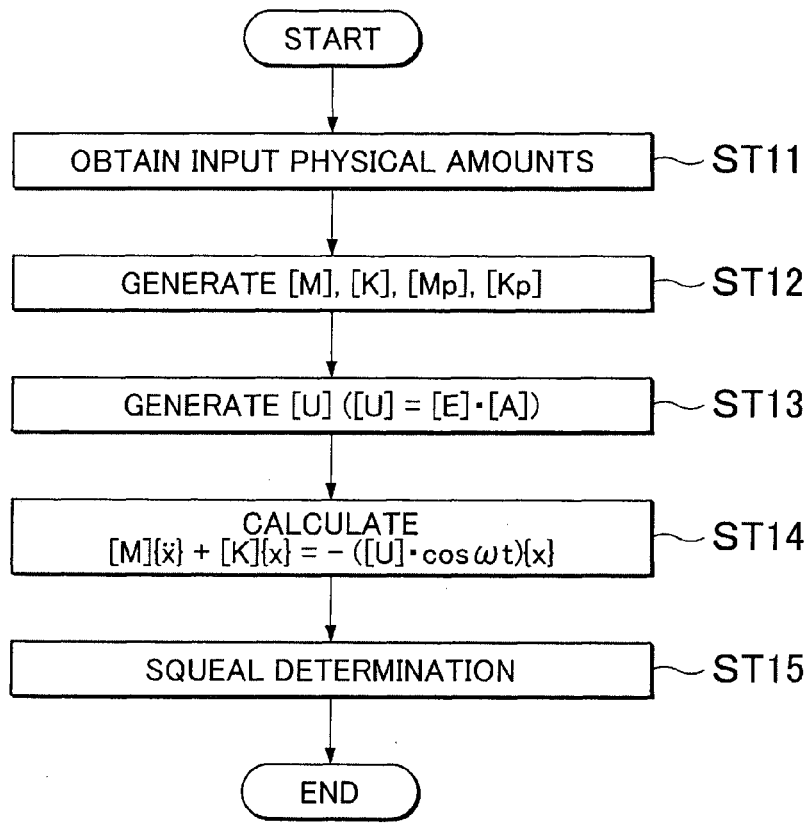
FIG. 2 is a flowchart of a disc brake vibration estimation method in accordance with a first embodiment.
Figure 3:
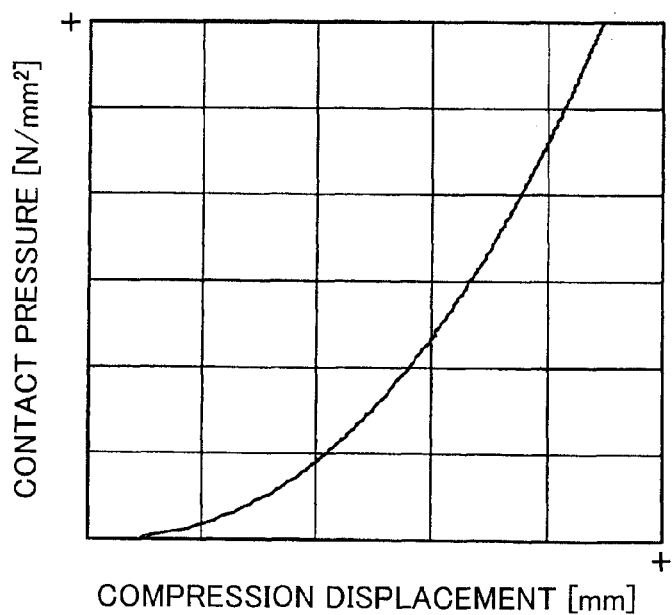
FIG. 3 is a graph that represents the relationship between contact pressure and compression displacement.

Next, the disc brake vibration estimation method by the disc brake vibration estimation device 1 will be described. FIG. 2 is a flowchart of the disc brake vibration estimation method in accordance with the first embodiment. FIG. 3 is a graph that represents the relationship between contact pressure and compression displacement.

As shown in FIG. 2, in the disc brake vibration estimation method, the input physical amount obtainment section 31 of the processing section 3 first obtains the input physical amount (step ST11).

The processing section 3 next generates the mass matrix [M] of the disc brake 100, the stiffness matrix [K] of the disc brake 100, a mass matrix [Mp] of the pads 102, 103, and a stiffness matrix [Kp] of the pads 102, 103 (step ST12). Here, the processing section 3 creates a model on the basis of the input physical amounts obtained by the input physical amount obtainment section 31, in this embodiment, a finite element model on the basis of a finite element method (FEM) for each of the caliper 101, the pads 102, 103, the disc rotor 104, the mounting bracket 105, and the hub 106 and combines those, thereby generating a model of the disc brake 100 (see FIG. 1). The processing section 3 next generates the mass matrix [M] and the stiffness matrix [K] from the whole model of the disc brake 100 and generates the mass matrix [Mp] and the stiffness matrix [Kp] from the models of the pads 102, 103. The model of the disc brake 100 may previously be generated. In such a case, the input physical amount obtainment section 31 may obtain the previously generated model of the disc brake 100.

Next, the processing section 3 generates the contact stiffness matrix [U] between the disc rotor 104 and the pads 102, 103 (step ST13). Here, the processing section 3 generates the contact stiffness matrix [U] on the basis of equation 2 indicated below. The contact stiffness matrix [U] serves to express a distribution of contact pressure during contact between the pads 102, 103 and the disc rotor 104 and an influence of amplitudes of the pads 102, 103.

$$[U]=[E]\cdot[A] \qquad \text{[Equation 2]}$$

Here, [E] is a matrix on the basis of the distribution of contact pressure during contact between the pads 102, 103 and the disc rotor 104, and [A] is a matrix on the basis of mode vectors of the pads 102, 103.

In this embodiment, in order to generate the matrix [E], a contact analysis between the models of the pads 102, 103 and the model of the disc rotor 104 is first conducted in the model of the disc brake 100, and the distribution of contact pressure of the pads 102, 103 is thereby obtained. As shown in FIG. 3, the stiffness (the slope of a curve between the contact pressure and a compression displacement) at each node is obtained on the basis of the contact pressure at each node that constitutes the models of the pads 102, 103 and the relationship between the contact pressure and the compression displacement that correspond to a friction material which forms contact surfaces of the pads 102, 103 with the disc rotor 104. The obtained stiffness is stored to component positions of the matrix [E] corresponding to positions of the nodes, thereby generating the matrix [E].

In this embodiment, in order to generate the matrix [A], a mode vector $v_i$ is first obtained on the basis of the mass matrix [Mp] of the pads 102, 103, the stiffness matrix [Kp], and equation 3 indicated below. The diagonal matrix [A] is next generated in which the obtained mode vector $v_i$ is stored in diagonal components and zero is put in the other component positions.

$$\{-\omega_i^2\cdot[Mp]+[Kp]\}\{v_i\}=0 \qquad \text{[Equation 3]}$$

Here, $v_i$ is a bending mode of the pads 102, 103 that corresponds to the in-plane vibration mode for estimating the model of the disc rotor 104. For example, because i=1 in a case of an in-plane first mode, $v_i$ is a mode vector in a first bending mode of the pads 102, 103.

The vibration estimation section 32 next executes calculation on the basis of the generated mass matrix [M], the stiffness matrix [K], the contact stiffness matrix [U], and equation 4 indicated below (step ST14). Here, the vibration estimation section 32 assumes equation 1 as equation 4, in other words, the left side as a mass term and a stiffness term and the right side as a time-dependent weight term, that is, a periodically changing term and conducts transient response calculation.

$$[M]\{\ddot{x}\}+[K]\{x\}=-([U]\cdot\cos\omega t)\{x\} \qquad \text{[Equation 4]}$$

The squeal determination section 33 next makes a determination about squeal of the disc brake 100 in the in-plane direction (step ST15). Here, in a case where the calculation by above equation 1 corresponds to the in-plane first mode, the squeal determination section 33 determines whether or not brake squeal in the in-plane first mode, in other words, brake squeal having a node at every 180 degrees in the circumferential direction of the disc rotor 104 (a portion at 90 degrees from the node is an anti-node). In this embodiment, the squeal determination section 33 determines whether or not the displacement x of a prescribed node in the model of the disc rotor 104 as an object of determination after the elapse of the prescribed period $t_0$ after the vibration estimation section 32 starts the calculation is the reference value $u_{max}$ or larger and determines that brake squeal of the disc brake 100 in the in-plane first mode occurs if the displacement x is the reference value $u_{max}$ or larger. Accordingly, the vibration of the disc brake 100 in the in-plane direction is estimated by the vibration estimation section 32, and the determination of whether or not brake squeal of the disc brake 100 in the in-plane direction occurs can thus easily be made by estimating the vibration of the disc brake 100 in the in-plane direction. Here, the reference value $u_{max}$ varies according to the shape, the dimension, and the materials of each of the elements constituting the disc brake 100 as an estimated object, the magnitude of contact pressure during contact between the pads 102, 103 and the disc rotor 104, the in-plane vibration mode to be obtained, and the like.

As described above, the disc brake vibration estimation method and the disc brake vibration estimation device 1 in accordance with this embodiment estimate the vibration of the disc brake 100 in the in-plane direction on the basis of the fluctuation of the contact stiffness between the disc rotor 104 and the pads 102, 103. In this embodiment, above equation 1 includes the periodically changing term and allows the contact stiffness matrix [U] to have periodic changes over time. In a related technique, the vibration of the disc brake 100 is estimated on the basis of a mathematical model (an equation of linear vibration) that is based on self-excited vibration phenomenon and that has the periodically changing term removed from above equation 1. This method of estimating the vibration of the disc brake 100 allows an estimation of disc brake 100 in an out-of-plane direction but has difficulty in the estimation of the disc brake 100 in the in-plane direction. The pads 102, 103 perform work in the tangent direction of the disc rotor 104 by frictional force on the disc rotor 104. When the direction of the frictional force is forward with respect to the direction of the in-plane vibration mode of the disc rotor 104, the work is positive, and the frictional force increases. When the directions are opposite to each other, the work is negative, and the frictional force decreases. Thus, the energy balance becomes positive when the sign (positive or negative) of work and the magnitude (large or small) of the frictional force match. Because the vibration diverges when the energy balance is positive, the vibration of the disc brake 100 in the in-plane direction can be estimated on the basis of the mathematical model (an equation of non-linear vibration) based on a parametric excitation phenomenon. Accordingly, because the vibration of the disc brake 100 is estimated on the basis of the fluctuation of the contact stiffness between the disc rotor 104 and the pads 102, 103, the vibration of the disc brake 100 in the in-plane direction can be estimated. Above equation 1 becomes the conventional mathematical model based on the self-excited vibration phenomenon by setting t=0. Therefore, an influence of the self-excited vibration phenomenon can be taken into consideration in the estimation of the vibration of the disc brake 100 in the in-plane direction.

Figure 4:
FIG. 4 is a diagram that illustrates comparison results between reproduction of an in-plane first mode and estimation of the in-plane first mode.

Here, it will be described that the disc brake vibration estimation method in accordance with this embodiment can actually estimate the vibration of the disc brake 100 in the in-plane direction. Specifically, a verification model is created, the in-plane first mode is reproduced in the verification model, and the transient response calculation of equation 4 is conducted. Whether or not the solution diverges is then examined on the basis of results. FIG. 4 is a diagram that illustrates comparison results between the reproduction of the in-plane first mode and the estimation of the in-plane first mode. The verification model was a simple finite element model of the disc rotor 104, in which linear hexahedron elements were used to generate a rotationally symmetrical mesh. The reproduction of the in-plane first mode was performed on the basis of the characteristic frequency in the in-plane first mode (approximately 8 kHz, for example) such that the reproduction corresponded to the actual article. Results shown in the figure were obtained. In the estimation of the in-plane first mode, the transient response calculation of above equation 4 was conducted with the period between 0 and 0.05 divided into 50,000 parts and the excitation frequency of the pads 102, 103 made as twice high as the characteristic frequency in the in-plane first mode. As shown in the figure, the solution diverged in the in-plane first mode, and results close to the reproduction of the in-plane first mode could be obtained.

Figure 5:
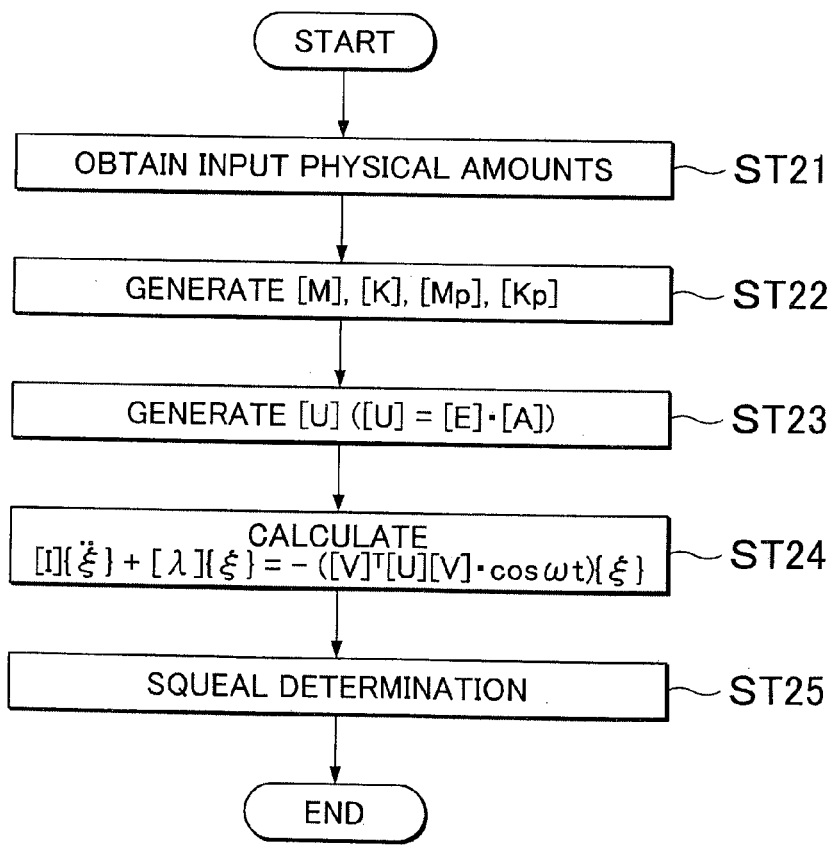
FIG. 5 is a flowchart of a disc brake vibration estimation method in accordance with a second embodiment.

Next, a disc brake vibration estimation method in accordance with a second embodiment will be described. FIG. 5 is a flowchart of the disc brake vibration estimation method in accordance with the second embodiment. The difference between the disc brake vibration estimation method in accordance with the second embodiment and the disc brake vibration estimation method in accordance with the first embodiment that is shown in FIG. 2 is execution of calculation on the basis of a degenerate mathematical model (an equation of non-linear vibration) of equation 4 that is used when the vibration estimation section 32 executes calculation. The disc brake vibration estimation device that carries out the disc brake vibration estimation methods in accordance with first and second embodiments is the same, and a description thereof will be omitted. Further, the disc brake vibration estimation method in accordance with the second embodiment is the same as the disc brake vibration estimation method in accordance with the first embodiment, and a description thereof will be omitted or simplified.

As shown in FIG. 5, in the disc brake vibration estimation method, the input physical amount obtainment section 31 of the processing section 3 first obtains the input physical amounts (step ST21). The processing section 3 next generates the mass matrix [M] of the disc brake 100, the stiffness matrix [K] of the disc brake 100, the mass matrix [Mp] of the pads 102, 103, and the stiffness matrix [Kp] of the pads 102, 103 (step ST22), and generates the contact stiffness matrix [U] between the disc rotor 104 and the pads 102, 103 (step ST23).

The vibration estimation section 32 next executes calculation on the basis of the generated mass matrix [M], the stiffness matrix [K], the contact stiffness matrix [U], and equation 5 indicated below (step ST24). Here, the vibration estimation section 32 conducts calculation of the eigenvalue of the left side of equation 1, assumes equation 1 as equation 5 that is overlapped vibration modes in the calculation range where responses of the disc rotor 104 are determined by a mode synthesis method, and thereby conducts the transient response calculation.

$$[I]\{\ddot{\xi}\}+[\lambda]\{\xi\}=-([V]^T[U][V]\cdot\cos \omega t)\{\xi\} \quad \text{[Equation 5]}$$

Here, [I] is an identity matrix on the basis of the mass matrix [M] of the disc brake 100, [λ] is a diagonal matrix on the basis of the stiffness matrix [K] of the disc brake 100, [V] is a mode vector matrix, and ξ is a weight in equation 6 indicated below.

Now, a way for obtaining equation 5 will be described. A degree i of the in-plane vibration mode which serves as a calculation range is first determined. The degree i of the in-plane vibration mode is higher than the in-plane vibration mode to be estimated in this embodiment and is lower than a high degree in-plane vibration mode that does not impair operation of the disc brake vibration estimation method. For example, in cases of estimating the vibration of the disc brake 100 in the in-plane first mode or an in-plane second mode, one of the sixth degree to the eighth degree is determined as the degree i of the in-plane vibration mode.

The displacement [x] is next expanded in modal coordinates to obtain equation 6 indicated below. Next, assuming that the in-plane vibration modes from the first to ith degrees contribute to the calculation, an equation in which parts corresponding to higher vibration modes than $\xi_i \cdot v_i$ are removed from equation 6 is obtained.

$$x=\xi_0+\xi_1 \cdot v_1+\xi_2 \cdot v_2+ \ldots +\xi_i \cdot v_i+ \ldots +\xi_n \cdot v_n \quad \text{[Equation 6]}$$

Here, $\xi_n$ is the weight, and $v_n$ is the mode vector.

Calculation of the eigenvalue of the left side in equation 4 is next conducted, and the result of the equation after the removal is used to degenerate equation 4, thereby obtaining equation 5. Here, the identity matrix [I] is the result of the multiplication of the mass matrix [M], a mode vector matrix $[V]^T$ put on the left side of [M], and the mode vector matrix [V] put on the right side of [M]. Further, the diagonal matrix [λ] is the result of the multiplication of the stiffness matrix [K], the mode vector matrix $[V]^T$ put on the left side of [K], and the mode vector [V] put on the right side of [K], in which the characteristic frequencies of the disc rotor 104 from the first to ith vibration modes are set to the diagonal components. Moreover, the mode vectors $v_1$ to $v_i$ of the first to ith vibration modes are aligned in the mode vector matrix [V].

The squeal determination section 33 determines whether or not brake squeal occurs in the in-plane first mode in a case where the calculation by equation 5 corresponds to the in-plane first mode, for example (step ST25).

As described above, the disc brake vibration estimation method and the disc brake vibration estimation device 1 in accordance with this embodiment can provide the same effect as the first embodiment because calculation is conducted by equation 5 in which the calculation range contains the ith vibration mode, and can largely reduce calculation cost because reduction in the degree of freedom of the matrices or calculation of inverse matrices is not required.

In the first and second embodiments, the squeal determination section 33 makes a determination about squeal of the disc brake 100 in the in-plane direction on the basis of the displacement after the prescribed period from the start of estimation. However, the present invention is not limited thereto, but the determination about squeal can be made on the basis of a value derived from the displacement. For example, the squeal determination section 33 determines whether or not the norm of the displacement x of a prescribed node in the model of the disc rotor 104 as an object of determination after the elapse of the prescribed period $t_0$ from the start of calculation by the vibration estimation section 32, that is, the start of estimation is a reference value $x_{max}$ or larger and determines that brake squeal of the disc brake 100 in the in-plane direction occurs if the displacement x is the reference value $x_{max}$ or larger. Here, the reference value $x_{max}$ varies according to the shape, the dimension, and the materials of each of the elements constituting the disc brake 100 as the estimated object, the magnitude of contact pressure during contact between the pads 102, 103 and the disc rotor 104, the in-plane vibration mode to be obtained, and the like.

Further, the disc brake vibration estimation method in accordance with the first and second embodiments can be used for a method of designing the disc brake 100. In the method of designing the disc brake 100, each component of the disc brake 100 is designed to reduce the vibration of the disc brake 100 in the in-plane direction that is estimated by the disc brake vibration estimation method.

The invention claimed is:

1. A disc brake vibration estimation method of estimating a vibration during contact between a disc rotor and a pad of a disc brake that generates braking force by bringing the disc rotor which is rotating into contact with the pad, the method comprising:
    a step of obtaining at least one of dimensions, masses, materials, moments of inertia, longitudinal elastic moduli, or shear moduli that are physical amounts relating to the disc rotor and the pad; and
    a step of estimating a vibration of the disc brake in an in-plane direction which is a circumferential direction of the disc rotor according to at least the at least one obtained physical amount and a fluctuation in magnitude of contact pressure during contact between the disc rotor and the pad,
    wherein the step of estimating the vibration of the disc brake is conducted according to equation 1 indicated below $[M]\{\ddot{x}\}+([K]+[U]\cdot\cos\omega t)\{x\}=0$  [Equation 1]

wherein [M] is a mass matrix of the disc brake, [K] is a stiffness matrix of the disc brake, [U] is a contact stiffness matrix between the disc rotor and the pad, ω is a pad characteristic frequency which corresponds to a vibration mode of the pad during the vibration of the disc brake in the in-plane direction, and x is a displacement of the disc brake.

2. The disc brake vibration estimation method according to claim 1, further comprising:
    a step of making a determination at least about squeal of the disc brake in the in-plane direction according to a displacement of the disc rotor or a value derived from the displacement of the disc rotor after a prescribed period from a start of estimation after the vibration of the disc brake is estimated.

3. The disc brake vibration estimation method according to claim 1,
    wherein the contact stiffness matrix is based on a distribution of contact pressure of the pad and a mode vector of the pad.

4. A disc brake vibration estimation device which estimates a vibration during contact between a disc rotor and a pad of a disc brake that generates braking force by bringing the disc rotor which is rotating into contact with the pad, the device comprising:
    an input physical amount obtainment section which obtains at least one of dimensions, masses, materials, moments of inertia, longitudinal elastic moduli, or shear moduli that are physical amounts relating to the disc rotor and the pad;
    a vibration estimation section which estimates a vibration of the disc brake in an in-plane direction which is a circumferential direction of the disc rotor according to at least the at least one obtained physical amount and a fluctuation in magnitude of contact pressure during contact between the disc rotor and the pad; and
    a display section which displays the estimated vibration of the disc brake,
    wherein the vibration estimation section estimates the vibration of the disc brake according to equation 1 indicated below $[M]\{\ddot{x}\}+([K]+[U]\cdot\cos\omega t)\{x\}=0$  [Equation 1]

wherein [M] is a mass matrix of the disc brake, [K] is a stiffness matrix of the disc brake, [U] is a contact stiffness matrix between the disc rotor and the pad, ω is a pad characteristic frequency which corresponds to a vibration mode of the pad during the vibration of the disc brake in the in-plane direction, and x is a displacement of the disc brake.

* * * * *